United States Patent
Morin

[15] 3,675,951
[45] July 11, 1972

[54] COUPLER FOR REINFORCED HOSE

[72] Inventor: Louis F. Morin, Springfield, Mass.

[73] Assignee: Everflex Products, Inc., Ludlow Hampden, Mass.

[22] Filed: Jan. 4, 1971

[21] Appl. No.: 103,720

[52] U.S. Cl..................................285/39, 285/149, 285/249
[51] Int. Cl.........................................F16l 39/02, F16l 33/22
[58] Field of Search.....................285/149, 248, 249, 39, 350

[56] References Cited

UNITED STATES PATENTS

| | | | |
|---|---|---|---|
| 656,187 | 8/1900 | Gunnell | 285/149 |
| 2,833,567 | 5/1958 | Bacher et al. | 285/149 X |
| 3,118,691 | 1/1964 | Press | 285/149 |
| 3,140,106 | 7/1964 | Thomas et al. | 285/149 |
| 3,083,989 | 4/1963 | Press | 285/149 X |

FOREIGN PATENTS OR APPLICATIONS

| | | | |
|---|---|---|---|
| 1,253,533 | 11/1967 | Germany | 285/149 |

*Primary Examiner*—Thomas F. Callaghan
*Attorney*—Alonzo L. Neal, John J. Dempsey and Arthur F. Dionne

[57] ABSTRACT

This invention is concerned with a device for coupling the end of a hose assembly of the type having an inner liner with an outer shield. The coupler is substantially cylindrical. It has threads at one end adapted to engage to a source such as a tank, etc. There is a hex shaped body portion to facilitate turning. An outer coupler fits over the shield of the hose and locks same to the surfaces on the main body portion. There is on the main body portion a cylindrical member or nipple portion of reduced diameter that fits within the inner liner of the hose. A ring circumscribes the inner liner and locks same about the outer surface of the cylindrical member. The outer coupler is threaded onto the main body portion near the hex surface creating friction pressure sealing engagement of the inner liner between the ring and nipple portion and a clamping engagement of the outer shield of the hose assembly between the ring and coupler.

2 Claims, 5 Drawing Figures

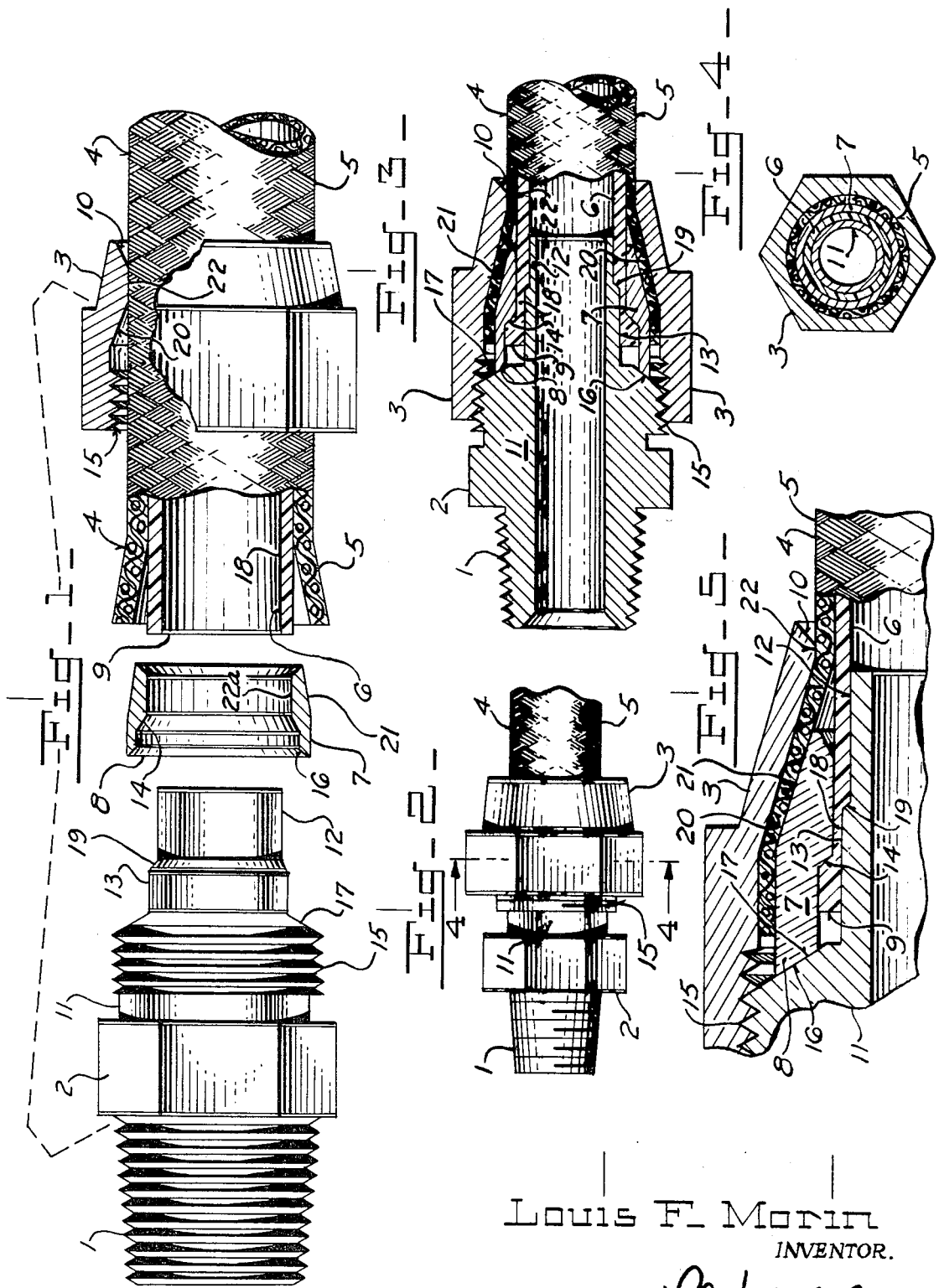

COUPLER FOR REINFORCED HOSE

The present invention is concerned with a novel hose fitting or end coupler that can be readily attached to a hose or tubing of the reinforced type having an elastomer inner tube within it for sealing purposes and an outer reinforcement exterior circumscribing the elastomer for strength and protective purposes. This hose fitting has the feature of being conveniently assembled to the reinforced hose by means of a simple technique and with conventional bench tools such as a wrench and vise. The end fitting has the advantage of being detached from one hose and reattached to another hose so as to render it reusable.

There exists a problem with the reinforced elastomer industry and especially in the technology of the reinforced polytetrafluoroethylene tube making for a type of hose fittings that can be attached to the hose at the site where the hose assembly is to be used without the use of bulky, heavy and expensive equipment. The latter equipment is impractical to use at the locations where the hose assembly is to be used.

Accordingly it is a feature of this invention to provide a fitting of simple mechanical design so as to be easily assembled and attached to an end of the reinforced hose. Because the design is simple, the attaching procedure is not complicated or restricted and may be performed by non-expert assemblers.

It is another feature of this invention to provide a fitting, which in the final stages of assembly, insures the seal and security of the connection with ease, by utilizing the torque or mechanical advantage of screwing the component parts together. Many elastomers cannot be compressed to the desired quantity without proper leverage. Hoses made of stiffer elastomers such as nylon and polytetrafluoroethylene are materials that need leverage assistance in assembly.

A further feature of this invention is to provide a fitting wherein there is no practical limit on the type of elastomer to which this fitting may be attached.

A still further feature of this invention is to provide a fitting having the advantage of being able to friction-compress the elastomer material the desired amount, be it large or small, to obtain the needed sealing capability while attaching to the outer reinforcement material to obtain the maximum holding power.

An additional object of the invention is to provide a fitting having the criteria of end fitting design, to wit: that an end fitting should always be equal to, or exceed in performance, the hose to which it is attached.

Not only is the percentage of the elastomer thickness easily controlled by this fitting, but also the length of the compressed area. It is elementary that both the thickness and length of compression are important to attain the sealing capacity.

It is also an object of this invention to provide a fitting with a design that is simple and inexpensive to manufacture since it can be created with standard drills, taps, thread chasers and simple form tools. Exotic or complex tools are not required.

The within invention fills the void wherein a fitting can be attached to a reinforced elastomer and perform satisfactorily in spite of great variations in the elastomer tubing and reinforcement during its manufacture. There are reinforced elastomers whose tolerance vary severely, not only from one manufacturer to another, but also within the manufacturer's own process itself. It is important to have a fitting that can be assembled and perform satisfactorily in spite of the dimensional variations of the hose.

The fitting should be such that, during assembly, the reinforcement material does not impede the assembly operation. The method of assembly for this fitting allows for a simple trimming technique eliminating the possibility of the reinforcement causing assembly difficulties.

The advantages and objects of this invention may be more clearly understood from the following detailed specifications and the drawings in which:

FIG. 1 is a side elevational view of the end fitting unassembled and of the reinforced elastomer hose.

FIG. 2 is a side elevational view of the fitting connected to the hose.

FIG. 3 is a longitudinal cross sectional view of FIG. 2 on an enlarged scale.

FIG. 4 is a cross sectional view of line 4—4 in FIG. 2.

FIG. 5 is a cross sectional view on a still larger scale of a portion of the fitting showing the details of the fitting in connection with the hose.

Reference is made to FIG. 1 in which the entire coupler unit is shown as being generally cylindrical. As appears in FIG. 1 at the left side are the threads 1 on the shank of the coupler and forming an outer connector end section thereof. Adjoining and contiguous to the threads 1 is a torque applying tool surface as the hex surface 2 of the coupler. To the right of the hex surface 2 is the hose attaching end section and contiguous with the hex is a portion of the main body 11 of the coupler. To the right of the main body portion at 11 are the threads 15 on the hose side of the hex 2. Contiguous with the threads 15 is an inwardly tapered shoulder surface 17 which adjoins a nipple surface 13 which is of a reduced diameter. To the right of and contiguous with the raised surface 13 is the inwardly tapered shoulder surface 19. To the right of the tapered surface 19 and contiguous therewith is the end surface 12 of the main body which is of reduced diameter and is proximate to the hose assembly.

The ring 7, which is cylindrical and is for circumscribing the inner hose, is shown in the exploded view of FIG. 1. This is located between the end surface 12 of the main body and the hose assembly 4 and particularly in position for sliding over the end at 9 of the inner liner tube 6.

The lead edge 8 of the ring 7 has a tapered bore opening at 6. Spaced inwardly from the lead edge is a beveled or inwardly tapered surface 14 within the bore of the ring 7. The smallest inner diameter surface of the ring 7 is located at 22a providing a reduced bore portion adjacent the rear edge of the ring. The outside surface of the ring 7 is tapered at 21 along the rear portion thereof. The hose assembly 4 comprises the hose shield 5, and liner tube 6. The outer coupler or back nut 3 circumscribes the hose assembly 4 and has threads 15 on its inside surface proximate the hose. There is a beveled surface 10 away from the main coupler.

The smallest inside diameter 22 is located in the outer coupler 3 adjacent the rear end thereof. The friction compression of the tubing 6 along the tube wall as at 18 will be explained hereinafter.

Reference is made to the view of FIG. 1. The reinforced elastomer hose assembly 4 is cut by any of a number of methods, such as abrasive saw, shears, hacksaw, etc. The newly cut end 9 should then be cleaned of any disturbed material caused by cutting. The back nut 3 is then placed over the reinforced elastomer tube 4 as shown in FIG. 1. It will slide over readily with the end 10 being tapered inwards. This taper 10 will allow easy placement of outer coupler or back nut 3 over the outside diameter of the hose shield 5. Should there be any variations in this outside diameter the tapered area 10 will still allow the entry of elastomer tubing 4 into the outer coupler or back nut 3. The back nut 3 is then placed a few inches away from the end of the reinforced elastomer tubing 4. At a later time, in attachment, it will be brought forward to complete the operation. The reinforcement shield 5 of hose 4 is then separated or raised away from the elastomer tube 6. This need only be done to the extent that allows the ring or sleeve 7 to start on its entry over the periphery of elastomer tube 6 and under the reinforcement shield 5. The ring or sleeve 7 is then pushed further onto the elastomer tube 6 until the end 8 of sleeve 7 is nearly even with the end 9 of elastomer tube 6. The reinforcement shield 5 is positioned to circumscribe the outside periphery of ring 7 as ring 7 is pushed in position. Should any of the braids of the reinforcement shield be disrupted or disoriented and become an obstacle to the coupling with the fitting assembly, the shield braids can be trimmed. The main body 11 should then be held firmly by means of the likes of a bench vise. The reinforced tubing end 9 with ring 7 in position is then pushed over insert 12 of the main body 11 up to and over the rim of raised surface 13. The positioning up to and over the rim of 13 is a simple operation.

The remaining operation to complete the coupling is accomplished by screwing back nut 3 onto body 11 at threads 15 as hereinafter described. Of importance is the fact that the elastomer tube 6 has its front portion 9 expanded over insert 12 up to and over the rim of 13.

The back nut 3 is then brought forward over the surface of the shield 5 to the main body 11, until it engages the threads 15 where it is turned with finger force for a few rotations to make threaded engagement with the body 11. The back nut 3 is then screwed forward on 15 by wrench to the point where sleeve 7 is in metal to metal contact at point 16 of sleeve 7 and point 17 of the main body 11. This metal to metal contact provides a pressure seal for liquids and gases should the pressure be exerted at that location within the end fitting.

The elastomer tubing 6 is friction compressed at 18. This friction compression at 18 (see FIGS. 3 and 5) can be regulated in design for the length and percentage of compression. At the point 18 the elastomer tubing 6 is in full sealing contact with the main body 11 and the sleeve 7. The tapered surface 14 of sleeve 7 and the tapered surface 19 of main body 11 are of such angles that they are unable to shear the elastomer tubing 6. A shallow angle at these points allows for a smooth friction compressing of the elastomer tubing 6.

During the time of completing the friction compression seal, the reinforcement shield 5 of the hose is sandwiched between the angled or shouldered surface 20 of back nut 3 and angled shoulder surface 21 of ring 7. The reinforcement shield 5 is thus held in a firm gripping position to maintain its full operating strength.

The reduced inside diameter of the outer coupling 3 is designated by the numeral 22 and is such that at the end of the fitting nearest the hose assembly 4 there will be a minimum of disturbance of the reinforcement and as much contact to the reinforcement so as to allow for full strength of the reinforced shield 5 to protect the hose assembly 4 including the inner tube 6 thereof.

The position of the surfaces are shown in the view of FIG. 4 which is a view in cross section taken along line 4—4 of FIG. 2. The outer section is that of the coupler 3. The inner hose 6 is indicated as being next to the main body of the coupler 11. The ring 7 circumscribes the hose 6. Circumscribing the ring 7 is the hose shield 5 which is located within the outer coupler 3.

Reference may also be had to the views of FIGS. 3 and 5 to see in more detail the arrangement as aforedescribed.

It is contemplated that these hose couplers may be made of various dimensions for the purpose of being adaptable to hoses of various diameters, but the principle herein taught shall not be impaired by the change in size to meet the requirements of the different size hoses. It is also to be stated that the details of construction are extremely important because it is necessary to obtain tight sealing and friction fitting to protect against inside pressure running through the hose and also to provide a coupling that is impervious to both external and internal trauma.

For a more detailed description, reference is ma-e to the following claims.

In consideration of the foregoing I claim:

1. A coupling device for reinforced flexible hose having an elastomeric inner liner tube within a tubular protective shield, comprising a main body member having an intermediate torque applying tool surface, an outer connector end section extending therefrom having releasably engageable fastening means, and an inner hose attaching end section having portions extending from said tool surface in the following order: a threaded portion, a cylindrical nipple portion of reduced diameter and an inwardly tapered nipple shoulder, a friction compression ring insertable between the outer shield and liner tube at the attached end of the hose, the outside wall of the ring extending from the inserted inner end thereof being of a reduced diameter, the bore of said ring from its fore end to its inner end including in the following order, a first cylindrical bore portion, an inwardly tapered bore shoulder and a reduced second cylindrical bore portion said first and second cylindrical bore portions being free of any projections; and an outer coupler nut for encircling the end of said hose shield and having an internally threaded bore at the fore end thereof for engaging said threaded portion of the body member, and, in spaced relation to said threaded fore end a reduced cylindrical bore adjacent the rear end of the nut, an intermediate angled shoulder extending forwardly from said reduced bore in substantially complementary relationship with said diametrically reduced outside wall surface of said ring member;

said ring in assembled relation having its fore end abutting the end of said threaded portion of the inner section of the main body, its tapered bore shoulder spaced forwardly of said nipple shoulder of the body, and its said reduced second bore portion extending longitudinally in surrounding relationship to said nipple portion of the body, said reduced second ring bore portion and underlying nipple portion having an annular spaced relation materially less than the wall thickness of the linear tube whereby, when said ring is inserted between the ends of the shield and liner and said nipple portion is inserted within the liner, the hose is anchored in sealed relation on the coupling by threading the shield encircling nut onto said threaded body portion and advancing said nut to progressively clamp the shield against said ring, thereby urging said ring forwardly along the end section of the liner tube surrounding said nipple portion and into seated relation against said threaded portion of the body, the forwardly applied longitudinal movement of said ring shoulder frictionally compressing the tube wall into a fluid tight sealing engagement within said annular spacing between said reduced second ring bore portion and said nipple portion and the frictional compression of the tube wall produces a cold flow of the tube material resulting in an expanded end portion which engages said first cylindrical bore portion and said bore shoulder of said ring.

2. A coupling device as set forth in claim 1, in which, a second reduced cylindrical nipple portion extends from said inwardly tapered nipple shoulder, the inner end of said second ring bore portion in assembled position of the ring lies in surrounding relation to said second nipple portion beyond said nipple shoulder and the annular spacing between said second ring bore portion and second nipple portion approximates said liner tube wall thickness.

* * * * *